US009519362B2

(12) United States Patent
Kim

(10) Patent No.: US 9,519,362 B2
(45) Date of Patent: Dec. 13, 2016

(54) DISPLAY APPARATUS FOR VEHICLE

(71) Applicant: Hyundai Motor Company, Seoul (KR)

(72) Inventor: Sung Un Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/472,266

(22) Filed: Aug. 28, 2014

(65) Prior Publication Data

US 2015/0169083 A1    Jun. 18, 2015

(30) Foreign Application Priority Data

Dec. 17, 2013 (KR) .................. 10-2013-0157571

(51) Int. Cl.
*G06F 3/038* (2013.01)
*G06F 3/0362* (2013.01)
*B60K 37/06* (2006.01)
*B60K 35/00* (2006.01)
*G06F 3/0487* (2013.01)

(52) U.S. Cl.
CPC ............... *G06F 3/038* (2013.01); *B60K 35/00* (2013.01); *B60K 37/06* (2013.01); *G06F 3/0362* (2013.01); *G06F 3/0487* (2013.01); *B60K 2350/102* (2013.01); *B60K 2350/1004* (2013.01); *B60K 2350/104* (2013.01); *B60K 2350/1032* (2013.01)

(58) Field of Classification Search
CPC . B60K 35/00; B60K 37/06; B60K 2350/1004; B60K 2350/102; B60K 2350/1032; B60K 2350/104; G06F 3/0362; G06F 3/038; G06F 3/0487

USPC ................................... 345/156, 184
See application file for complete search history.

(56) References Cited

U.S. PATENT DOCUMENTS

| 5,977,690 A * | 11/1999 | Ellis, II | H03K 17/965 310/311 |
| 6,307,304 B1 * | 10/2001 | Yorio | H01H 19/005 310/339 |
| 6,636,197 B1 * | 10/2003 | Goldenberg | G05G 1/08 345/156 |
| 2011/0018832 A1 * | 1/2011 | Pryor | G06F 3/0312 345/173 |
| 2012/0298494 A1 * | 11/2012 | Mahida | G05G 5/06 200/336 |

FOREIGN PATENT DOCUMENTS

| JP | 02070277 A | * | 3/1990 |
| KR | 10-0867817 B | | 11/2008 |
| KR | 10-2011-0128995 A | | 12/2011 |
| KR | 10-2012-0074831 A | | 7/2012 |

* cited by examiner

*Primary Examiner* — Amare Mengistu
*Assistant Examiner* — Stacy Khoo
(74) *Attorney, Agent, or Firm* — McDermott Will & Emery LLP

(57) ABSTRACT

A display apparatus for a vehicle includes a screen on which an image is displayed. A projector projects the image to the screen, and a knob is rotatably disposed at one side of the screen. A vibration sensor senses a vibration and outputs a vibration signal. A controller determines a rotational direction and a rotational amount of the knob based on the vibration signal output from the vibration sensor.

9 Claims, 6 Drawing Sheets

DISPLAY APPARATUS FOR VEHICLE

CROSS-REFERENCE TO RELATED APPLICATION

This application claims the benefit of priority to Korean Patent Application No. 10-2013-0157571 filed in the Korean Intellectual Property Office on Dec. 17, 2013, the entire contents of which are incorporated herein by reference.

TECHNICAL FIELD

The present disclosure relates to a display apparatus for a vehicle, and more particularly, to a display apparatus for a vehicle including a knob.

BACKGROUND

In order to operate various functions of a vehicle, various input devices such as a keypad, a jog dial, and a touch screen are used. Recently, in order to improve a user's operation and a vehicle's interior design, an attempt to apply a touch display apparatus to a cluster or an auto video navigation (AVN) has been progressed.

In a case of a touch recognizing type display apparatus, under a graphic user interface (GUI) environment, user-customizable functions may be configured to provide convenience in operation.

However, in volume control and frequency control of an audio device, air volume control of an air conditioning device, or the like, an analog input device such as a knob may be more intuitive and convenient to the user.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a display apparatus for a vehicle having advantages of having a knob in a screen on which an image is displayed to provide an analog operation.

According to an exemplary embodiment of the present disclosure, a display apparatus for a vehicle includes a screen on which an image is displayed. A projector projects the image to the screen. A knob includes a knob rotator rotatably disposed at one side of the screen. A vibration sensor senses a vibration and outputs a vibration signal. A controller is configured to determine a rotational direction and a rotational amount of the knob based on the vibration signal output from the vibration sensor.

The controller may select a pulse having a preceding output timing of the first pulse and the second pulse and determine the rotational direction of the knob according to a selection result.

The controller may calculate the rotational amount of the knob based on the number of the first pulse.

The controller may calculate the rotational amount of the knob based on the number of the second pulse.

The first distance may be the same as the second distance.

An installation height for the knob rotator of each of the plurality of reference protrusions may be different from an installation height for the knob rotator of each of the plurality of directional protrusions.

The plurality of reference protrusions and the plurality of directional protrusions may be made of rigid materials, and the first vibrator and the second vibrator may be made of elastic materials.

The display apparatus for the vehicle may further include an application driver executing an application function according to a control signal of the controller. The controller may output the control signal corresponding to the rotational direction and the rotational amount of the knob.

According to another exemplary embodiment of the present disclosure, a display apparatus for a vehicle includes a screen on which an image is displayed. A projector projects the image to the screen. A plurality of knobs includes a knob rotator rotatably disposed at one side of the screen. At least three vibration sensors sense a vibration and output a vibration signal. A controller is configured to determine a rotating knob among the plurality of knobs based on the vibration signal output from the at least three vibration sensors and determines a rotational direction and a rotational amount of the rotating knob.

The controller may determine the rotating knob according to a triangulation algorithm based on distance information, position information, and direction information which correspond to each of the plurality of knobs and the at least three vibration sensors.

The display apparatus for the vehicle may further include an application driver configured to execute an application function according to a control signal of the controller, in which the application function may be mapped for each knob.

The controller may determine a touch point on the screen according to a triangulation algorithm based on distance information, position information, and direction information which correspond to the at least three vibration sensors.

The image displayed on the screen may include a user interface configured by a plurality of selectable objects, and the controller may output the control signal for driving the application function mapped in the selected objects, when the touch point corresponds to any one of the plurality of objects.

As described above, according to an exemplary embodiment of the present disclosure, it is possible to determine a rotational direction and a rotational amount of a knob based on a vibration signal output from a vibration sensor.

Further, it is possible to recognize a touch by using the vibration sensor.

The knob does not require a wire, a signal line, or the like to be easily applied to a rear projection type display apparatus.

DETAILED DESCRIPTION

Figure 1:
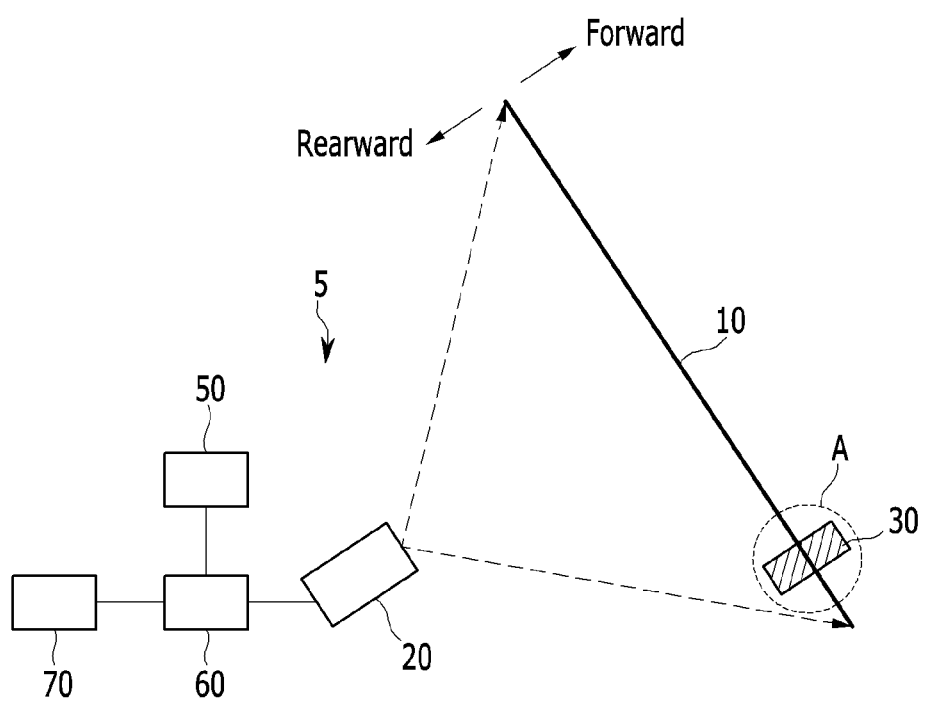
FIG. 1 is a configuration diagram illustrating a display apparatus for a vehicle according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

Parts which are not associated with the description are omitted in order to clearly describe the present disclosure and like reference numerals refer to like elements throughout the specification.

Further, in the drawings, each element is arbitrarily illustrated for convenience of description, and the present invention is not necessarily limited to those illustrated in the drawings.

Figure 2:
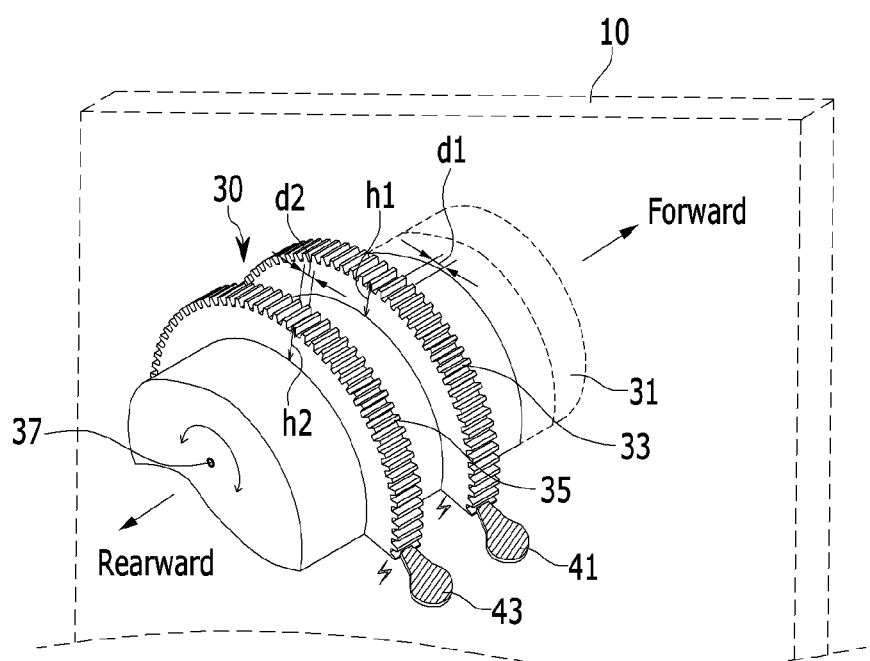
FIG. 2 is an enlarged perspective view of a portion A of FIG. 1.

FIG. 1 is a configuration diagram illustrating a display apparatus for a vehicle according to an exemplary embodiment of the present disclosure. FIG. 2 is an enlarged perspective view of a portion A of FIG. 1.

As illustrated in FIGS. 1 and 2, a display apparatus 5 for a vehicle according to the exemplary embodiment of the present disclosure includes a screen 10, a projector 20, a knob 30, a first vibrator 41, a second vibrator 43, a vibration sensor 50, and a controller 60.

The display apparatus 5 for the vehicle may be installed in a dashboard.

An image is projected to the screen 10 from the projector 20 provided at the rear of the screen 10, and a user may visually recognize the image displayed on the screen 10. The image may include instrument panel information, route guidance information, traffic information, audio device information, air conditioning device information, and the like. The screen 10 may be made of a transparent acryl material.

As illustrated in FIG. 2, the knob 30 includes a knob rotator 31, a plurality of reference protrusions 33, and a plurality of directional protrusions 35.

The knob 30 is rotatably provided at one side of the screen 10. When the user rotates the knob rotator 31 protruding forward from the screen 10 in a clockwise direction or a counterclockwise direction, the knob 30 rotates in the clockwise or counterclockwise direction based on a rotation shaft 37.

The plurality of reference protrusions 33 are provided at a first distance d1 along an outer circumference of the knob rotator 31, and the plurality of directional protrusions 35 are provided at a second distance d2 along an outer circumference of the knob rotator 31. The plurality of reference protrusions 33 and the plurality of directional protrusions 35 are provided at the rear side of the screen 10. The first distance d1 and the second distance d2 may be set as distances which those skilled in the art are deemed desirable by considering an outer diameter and the like of the knob 30. The second distance d2 may correspond to n times of the first distance d1 (n is a natural number larger than 1). That is, the first distance d1 and the second distance d2 may be the same as each other.

Friction occurs between the reference protrusion 33 and the first vibrator 41 by the rotation of the knob 30, and the first vibrator 41 generates first vibration by the friction with the reference protrusion 33.

Friction occurs between the directional protrusion 35 and the second vibrator 43 by the rotation of the knob 30, and the second vibrator 43 generates second vibration by the friction with the directional protrusion 35.

In order to generate the first vibration and the second vibration, the plurality of reference protrusions 33 and the plurality of directional protrusions 35 may be made of rigid materials, and the first vibrator 41 and the second vibrator 43 may be made of elastic materials.

Further, positions of the first vibrator 41 and the second vibrator 43 are set so that a generation timing of the first vibration and a generation timing of the second vibration are different from each other.

An installation height h1 for the knob rotator 31 of each of the plurality of reference protrusions 33 and an installation height h2 for the knob rotator 31 of each of the plurality of directional protrusions 35 may be set as heights which those skilled in the art are deemed desirable by considering the positions of the first vibrator 41 and the second vibrator 43. The installation height h1 and the installation height h2 may be different from each other so that strength of the first vibration and strength of the second vibration are different from each other. Hereinafter, in the exemplary embodiment of the present disclosure, a case where the installation height h1 is higher than the installation height h2 will be described.

The vibration sensor 50 is provided at the rear of the screen 10 to sense the vibration and outputs a vibration signal corresponding to the sensed vibration. The vibration signal is transferred to the controller 60.

The controller 60 is connected to the projector 20 and the vibration sensor 50 and may be implemented by at least one microprocessor which operates by a set program. The set program may include a series of commands for performing respective steps included in a method of determining a rotational direction and a rotational amount of the knob 30 according to the exemplary embodiment of the present disclosure.

Hereinafter, the method of determining a rotational direction and a rotational amount of the knob 30 according to the exemplary embodiment of the present disclosure will be described with reference to FIG. 3.

Figure 3:
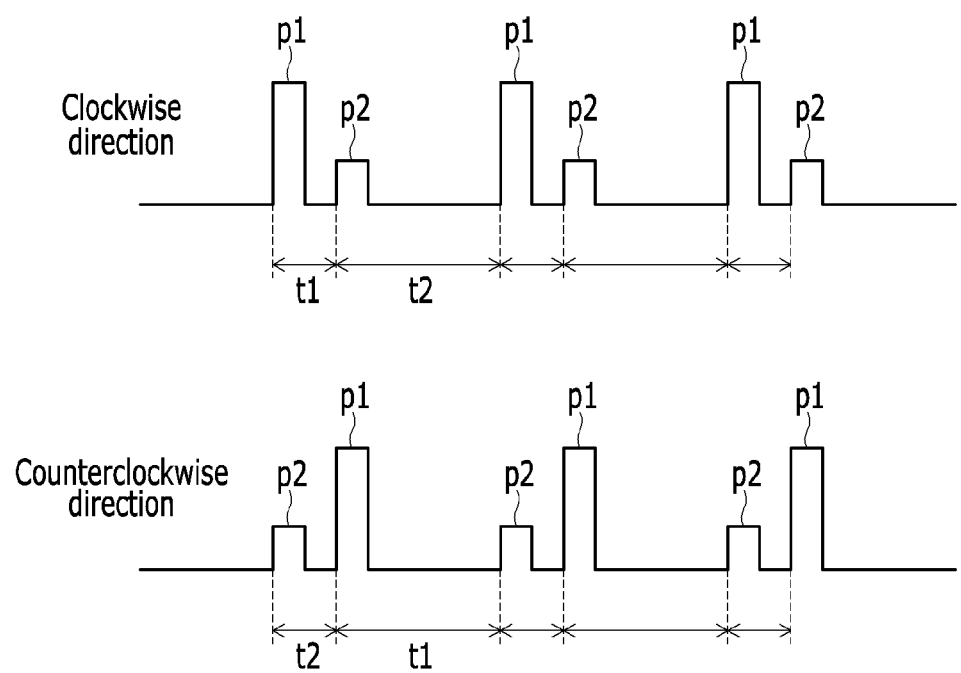
FIG. 3 is a diagram illustrating a vibration signal output from a vibration sensor according to an exemplary embodiment of the present disclosure.

FIG. 3 is a diagram illustrating a vibration signal output from a vibration sensor according to the exemplary embodiment of the present disclosure.

As illustrated in FIG. 3, waveforms of the vibration signal output from the vibration sensor 50 according to a rotational direction of the knob 30 are different from each other. The vibration sensor 50 senses the first vibration to output a first pulse p1, and senses the second vibration to output a second pulse p2. When the installation height h1 is higher than the installation height h2, a level of the first pulse p1 is higher than a level of the second pulse p2.

The first pulses p1 and the second pulses p2 are repetitively output according to the rotation of the knob 30. The controller 60 selects a preceding pulse based on an output timing of the first pulse p1 and an output timing of the second pulse p2, and determines the rotational direction of the knob 30 according to a selection result.

In detail, when a time t1 until the output of the second pulse p2 after the output of the first pulse p1 is shorter than a time t2 until the output of the first pulse p1 after the output of the second pulse p2, the controller 60 selects the first pulse p1 as the pulse having the preceding output timing.

Further, when the time t2 until the output of the first pulse p1 after the output of the second pulse p2 is shorter than the time t1 until the output of the second pulse p2 after the output of the first pulse p1, the controller 60 selects the second pulse p2 as the pulse having the preceding output timing.

The controller 60 may determine that the knob 30 rotates in the clockwise direction when the selected pulse is the first pulse p1, and the knob 30 rotates in the counterclockwise direction when the selected pulse is the second pulse p2.

A relationship between the preceding pulse and the rotational direction of the knob 30 may vary according to a layout of the plurality of reference protrusions 33, the plurality of directional protrusions 35, the first vibrator 41, and the second vibrator 43.

The controller 60 may calculate the rotational amount of the knob 30 based on the number of first pulses p1. For example, the controller 60 adds the number of first pulses p1 and divides the added number of first pulses by a total number of reference protrusions 33 to calculate the rotational amount. The divided value may be substituted with another value by multiplying a proportional constant for converting a unit. Further, the controller 60 may calculate the rotational amount of the knob 30 based on the number of second pulses p2 in the same method as described above.

Figure 4:
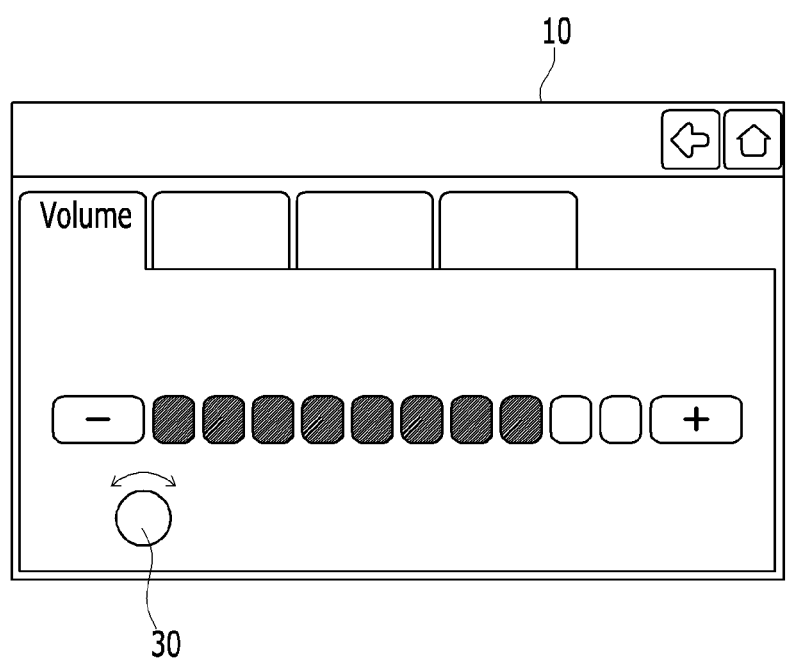
FIG. 4 is a diagram schematically illustrating a screen on which an image is displayed according to an exemplary embodiment of the present disclosure.

FIG. 4 is a diagram schematically illustrating a screen on which an image is displayed according to an exemplary embodiment of the present disclosure.

The display apparatus 5 for the vehicle according to the exemplary embodiment of the present disclosure may further include an application driver 70 executing an application function according to a control signal of the controller 60. The application function means an application function of a plurality of electronic devices (for example, an audio device, an air conditioning device, and the like) provided in the vehicle.

The controller 60 may output a control signal corresponding to the rotational direction and the rotational amount of the knob 30 to the application driver 70. For example, when the image displayed on the screen 10 includes audio device information, the application driver 70 may control a volume according to the rotational direction and the rotational amount of the knob 30. Further, when the image displayed on the screen 10 includes air conditioning device information, the application driver 70 may control a temperature according to the rotational direction and the rotational amount of the knob 30.

Figure 5:
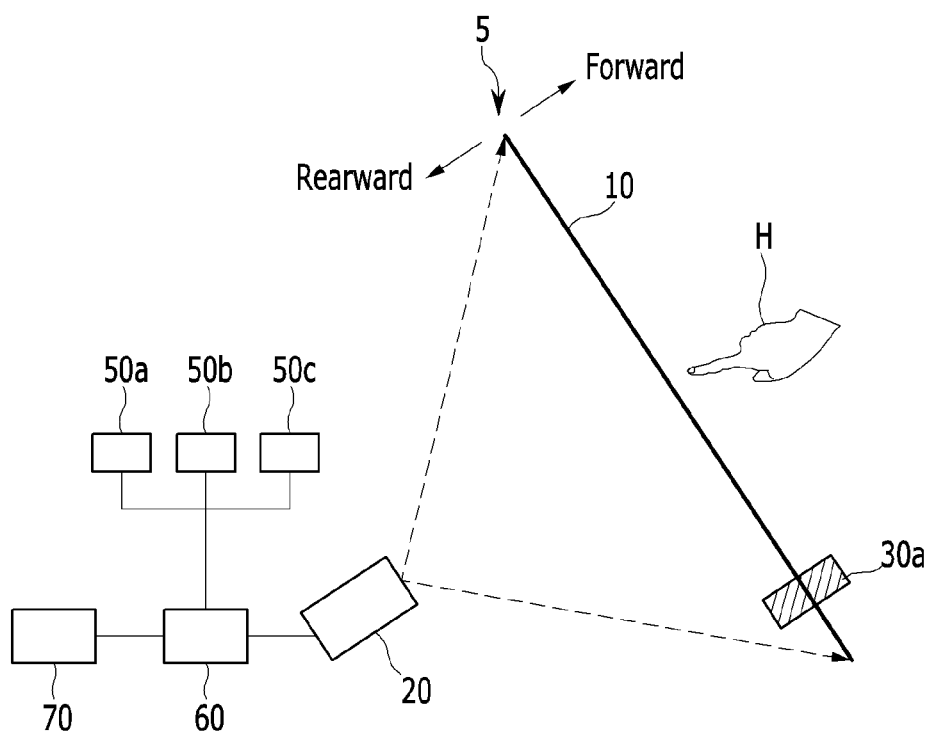
FIG. 5 is a configuration diagram illustrating a display apparatus for a vehicle according to another exemplary embodiment of the present disclosure.
Figure 6:
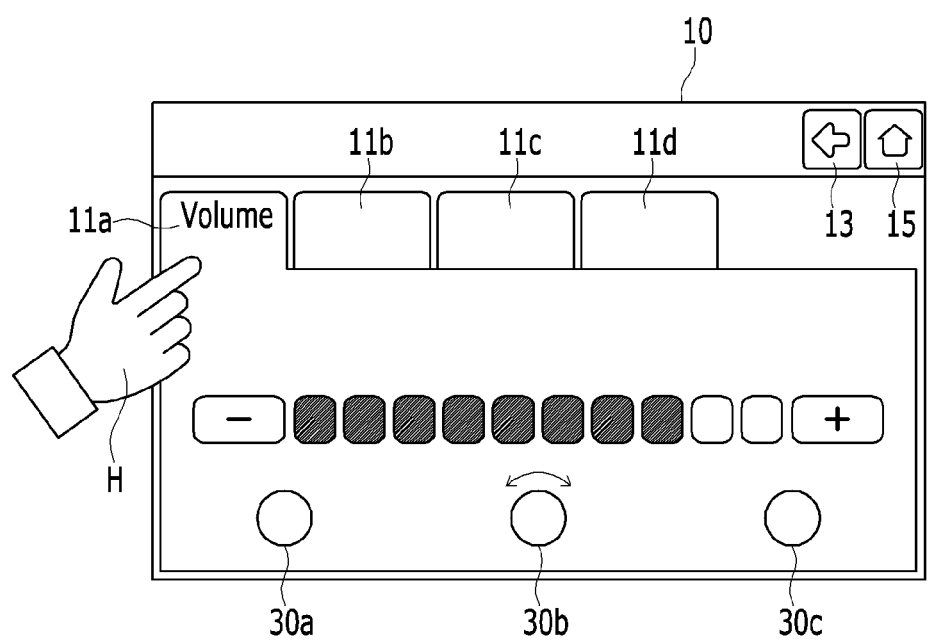
FIG. 6 is a diagram schematically illustrating a screen on which an image is displayed according to another exemplary embodiment of the present disclosure.

FIG. 5 is a configuration diagram illustrating a display apparatus for a vehicle according to another exemplary embodiment of the present disclosure. FIG. 6 is a diagram schematically illustrating a screen on which an image is displayed according to another exemplary embodiment of the present disclosure.

The same constituent elements as the exemplary embodiments described above designate the same reference numerals, and the duplicated description is omitted.

Referring to FIGS. 5 and 6, a display apparatus 5 according to another exemplary embodiment of the present disclosure is based on the structure of the aforementioned exemplary embodiment, and includes a plurality of knobs 30a, 30b, and 30c, and at least three vibration sensors 50a, 50b, and 50c.

The application function may be mapped for each knob. For example, a knob 30a corresponding to frequency searching of an audio device, a knob 30b corresponding to a volume control of the audio device, and a knob 30c corresponding to a temperature control of an air conditioning device may be provided.

The controller 60 may determine the rotating knob 30b according to a triangulation algorithm based on distance information, position information, and direction information which correspond to each of the plurality of knobs 30a, 30b, and 30c and at least three vibration sensors 50a, 50b, and 50c.

Further, the image displayed on the screen 10 may include a user interface configured by a plurality of selectable objects 11a, 11b, 11c, 11d, 13, and 15. The object means information which is selected by a user's input to be controlled according to the intention of the user. For example, the object may include an image, an icon, a folder icon, text content, a list, and the like.

The user may select a desired object 11a among the plurality of objects 11a, 11b, 11c, 11d, 13, and 15. When a hand H of the user touches the screen 10, the vibration is generated, and the controller 60 may determine a touch point on the screen 10 according to the triangulation algorithm based on distance information, position information, and direction information which correspond to each of the at least three vibration sensors 50a, 50b, and 50c.

The controller 60 may output a control signal for driving an application function (volume setting) mapped in the selected object 11a to the application driver 70.

As a result, according to the exemplary embodiment of the present disclosure, as described above, the controller 60 may determine the rotational direction and the rotational amount of the knob 30 based on the vibration signal output from the vibration sensor 50.

Further, the touch may be recognized by using the at least three vibration sensors 50a, 50b, and 50c.

The knob 30 does not require a wire, a signal line, or the like to be easily applied to a rear projection type display apparatus.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A display apparatus having a knob, comprising:
a screen on which an image is displayed;
a projector projecting the image to the screen;
a knob rotatably disposed at one side of the screen, wherein the knob includes: a knob rotator; a plurality of reference protrusions provided at a first distance along an outer circumference of the knob rotator; and a plurality of directional protrusions provided at a second distance along the outer circumference of the knob rotator;
a vibration sensor sensing a vibration from the knob and outputting a vibration signal;
a controller configured to determine a rotational direction and a rotational amount of the knob based on the vibration signal output from the vibration sensor,
a first vibrator configured to generate a first vibration by friction with the reference protrusions; and
a second vibrator configured to generate a second vibration by friction with the directional protrusions,
wherein the vibration sensor senses the first vibration to output a first pulse and senses the second vibration to output a second pulse, and
wherein a level of the first pulse is different from a level of the second pulse and an output timing of the first pulse is different from an output timing of the second pulse.

2. The display apparatus of claim 1, wherein the controller selects a pulse having a preceding output timing of the first pulse and the second pulse, and determines the rotational direction of the knob according to a selection result.

3. The display apparatus of claim 1, wherein the controller calculates the rotational amount of the knob based on a number of the first pulse.

4. The display apparatus of claim 1, wherein the controller calculates the rotational amount of the knob based on a number of the second pulse.

5. The display apparatus of claim 1, wherein the first distance is the same as the second distance.

6. The display apparatus of claim 1, wherein an installation height for the knob rotator of each of the plurality of reference protrusions is different from an installation height for the knob rotator of each of the plurality of directional protrusions.

7. The display apparatus of claim 1, wherein the plurality of reference protrusions and the plurality of directional protrusions are made of rigid materials.

8. The display apparatus of claim 1, wherein the first vibrator and the second vibrator are made of elastic materials.

9. The display apparatus of claim 1, further comprising:
an application driver configured to execute an application function according to a control signal of the controller,
wherein the controller outputs the control signal corresponding to the rotational direction and the rotational amount of the knob.

* * * * *